FIG. 2

INVENTORS.
KENNETH V. HARDMAN &
ALFRED J. ANDERSON
BY

ATTORNEYS

Feb. 7, 1967  K. V. HARDMAN ET AL  3,302,832
CAULKING GUN
Filed March 21, 1966  6 Sheets-Sheet 6

INVENTORS
KENNETH V. HARDMAN &
ALFRED J. ANDERSON
BY
Eyre, Mann & Lucas
ATTORNEYS

United States Patent Office 3,302,832
Patented Feb. 7, 1967

3,302,832
CAULKING GUN
Kenneth V. Hardman, Upper Montclair, and Alfred J. Anderson, Livingston, N.J., assignors to H. V. Hardman Co., Inc., a corporation of New Jersey
Filed Mar. 21, 1966, Ser. No. 540,790
14 Claims. (Cl. 222—94)

This application is a continuation-in-part of a co-pending application Serial Number 448,387 filed on April 15, 1965, now abandoned, said application Serial Number 448,387 in turn being a continuation-in-part of an earlier co-pending application Serial Number 313,960 filed on October 4, 1963 and now U.S. Patent No. 3,187,951.

This invention relates to a hand operated device in the nature of a gun which mixes and dispenses flowable reactive materials from both collapsible and non-collapsible tubes. The flowable materials are loaded into the gun by the operator in separate tubes especially designed for use with the gun. After the gun is loaded, the operator merely points the nozzle of the gun at the place where he desires to apply the gun's contents and presses the trigger. The gun then strips the flowable reactive material from the tubes, forces them into a mixing chamber where they are mixed and immediately dispensed as a mixture on to the target area. The means used for stripping the reactant materials from collapsible tubes can be readily modified so that it can also be used for stripping the material from non-collapsible tubes, as will be explained below.

The new and unique manner of arranging the stripping means for collapsible tubes in accordance with the invention achieves several surprising and unexpected results. First, such stripping means can dispense substantially all of the material from the tubes and they also materially increase the accuracy of the amount of material that is dispensed from the tubes. Also, the stripping means wind the collapsible tubes on a shaft in a uniform and positive manner without kinks or folds, which could disturb the accuracy of the material being dispensed, and without cracking or breaking the collapsible metal tubes. Such results are achieved by arranging a worm gearing drive or lead screw to provide a thrust in a direction opposite to the direction of wind-up of the tubes. More specifically, the motor drive for the gun is connected through a gear train to rotate the lead screw on which a wind-up assembly is seated so as to move the wind-up assembly in a direction opposite to the direction in which the tubes wind. That this arrangement will operate and give the above-described advantages is completely surprising since it has been heretofore considered necessary that the wind-up assembly move in the same direction as the tubes wind.

The material is dispensed from the collapsible tubes as the tubes wind around a shaft which is part of the wind-up assembly. As the tubes coil around the shaft, they pull the wind-up assembly in the direction of wind of the tubes and thereby overcome the reverse thrust exerted by the lead screw on the assembly. This reverse thrust is extremely important since it is the primary means by which the unexpected advantages of the invention are achieved.

The stripping means of the invention can be readily modified so as to dispense flowable materials from non-collapsible tubes by replacing the wind-up assembly with pistons, and reversing the direction of rotation of the lead screw so as to force the pistons into the non-collapsible tubes and thereby dispense the flowable material from the tubes. In order to obtain the correct direction of rotation of the lead screw, the motor direction can be reversed or the lead screw can be replaced with one having an opposite cut thread. Since most motors rotate in a counterclockwise direction when viewing the motor from the front, the lead screw will have a right-hand helical thread when used for collapsible tubes and a left-hand thread when used for non-collapsible tubes.

Another important feature of the gun is that it provides for disengagement of the stripping means from the motor when the flowable material has been stripped from the tubes. This will prevent damage to the motor which might occur should it continue to run after the tubes have been emptied. Such disengagement is automatically effected by a clutch means which disengages the lead screw from the motor driven gear train when the clutch means is contacted by the stripping means. The clutch means is arranged so that the stripping means will only contact the clutch means when almost all the material in the tubes have been dispensed.

Another important feature of the gun is an automatic cut-off valve assembly which will prevent the flowable material from dripping out of the gun after its trigger has been released to the off position. This valve assembly which includes two cut-off valves opens the entry ports into the mixing chamber prior to the time the motor turns on and closes the ports only after the motor has been turned off. It is very important that the cut-off valves be closed after the motor has been turned off or opened before the motor is turned on in order to prevent pumping against closed valves which could cause the tubes to rupture.

Further details of the present invention and its advantages will be readily understood by reference to the accompanying drawings which illustrate preferred embodiments of the invention and in which.

Figure 1:
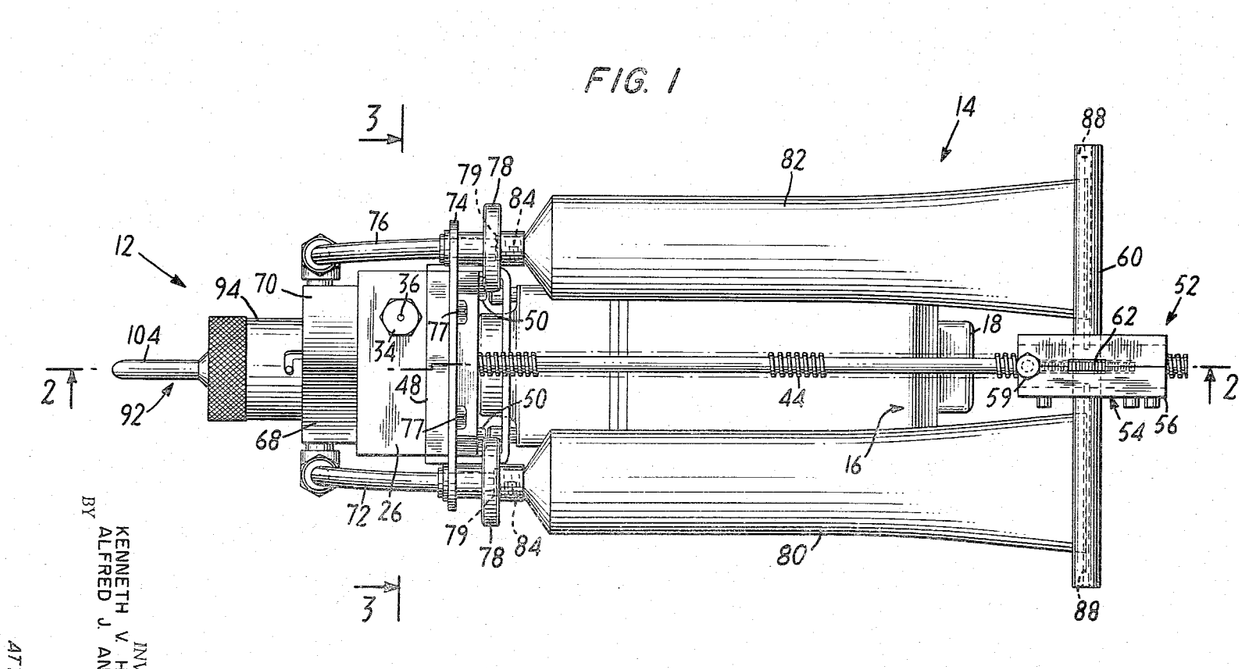
FIG. 1 is a top elevation of a caulking gun equipped with collapsible tubes and wind-up assembly in accordance with the invention.

Referring to FIG. 1 the caulking gun comprises mixing means 12, stripping means 14 for stripping the flowable reactive materials from collapsible tubes into the mixing means and a prime mover or power means 16 for driving the mixing and stripping means.

Figure 2:
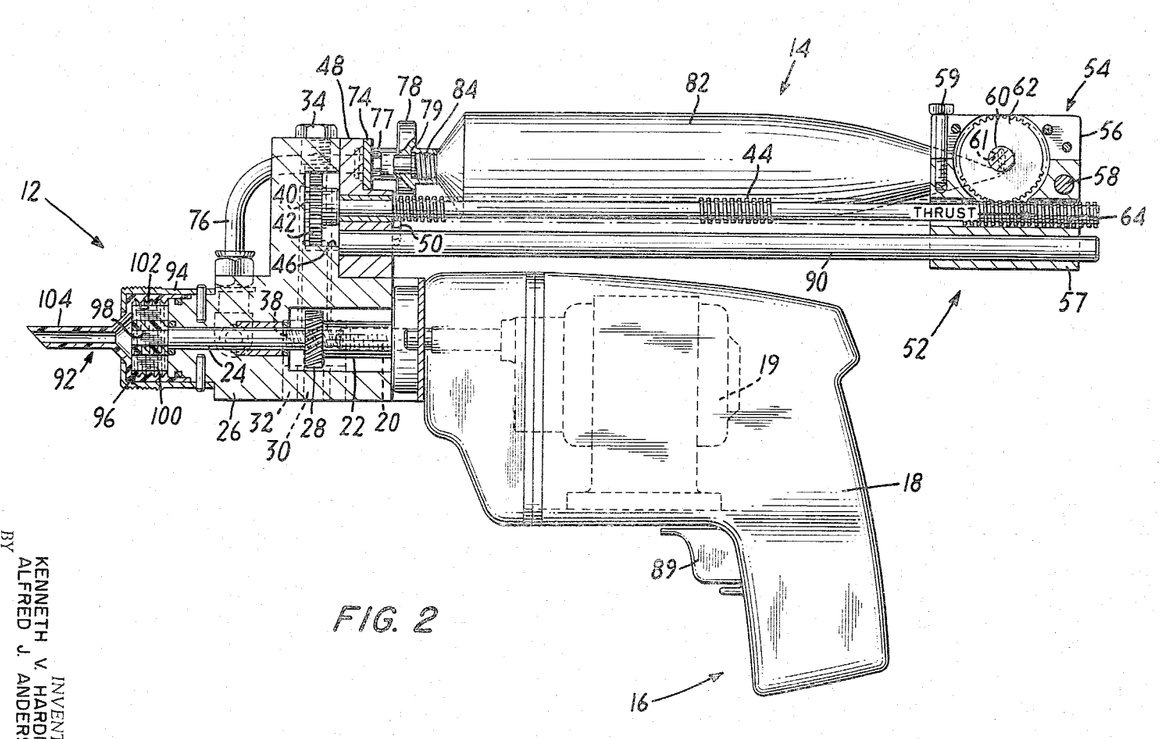
FIG. 2 is a partial sectional view taken along line 2—2 of FIG. 1.

As best shown in FIG. 2, the power means 16 consists of a standard ⅜" drill 18 that has been modified by the removal of the usual Jacobs chuck. The shaft 20 of drill 18 is driven by a conventional electric motor 19. The rotative drive shaft 20 of the drill is attached as at 22 to one end of a main rotative drive shaft 24.

The stripping means 14 includes a housing 26 which contains suitable gears for transmitting the rotation of main drive shaft 24 to the stripping means 14. As best shown in FIG. 2 the gear train in housing 26 comprises a helical gear 28 which has a 45° angle right-hand thread and is mounted in fixed position on the main drive shaft 24. A second transfer drive shaft 30 is rotatively mounted in housing 26 in vertical position by suitable bearings 32 and 34. The bearing 34 is provided with an oil hole 36 for lubricating the bearings and gears contained in housing 26. A second helical gear 38 having a 45° angle right-hand thread is mounted in fixed position on transfer shaft 30 so as to mesh with the helical gear 28 in order to transmit rotation to the transfer shaft 30. A worm 40 with right-hand thread is also fixed in position on transfer shaft 30 and located on the shaft so as to mesh with a gear 42, which also has a right-hand thread to form a worm gearing arrangement.

Figures 3, 5, 6, 7:
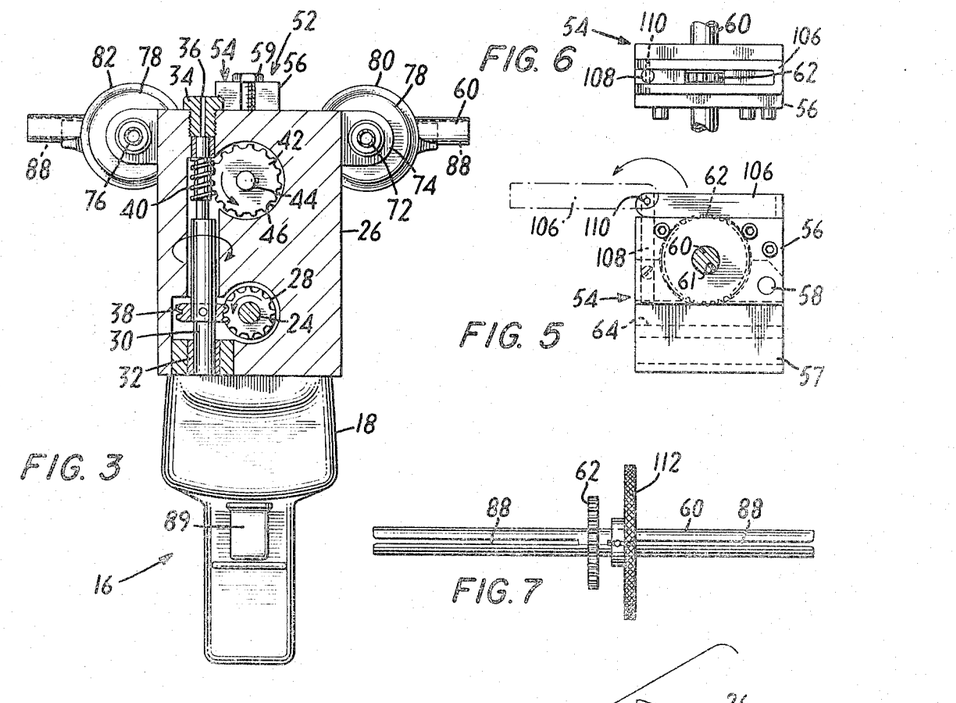
FIG. 3 is a section taken along line 3—3 of FIG. 1.
FIG. 5 is a modified form of the release mechanism utilized in FIG. 1 for disengaging the wind-up assembly from the lead screw.
FIG. 6 is a top view of FIG. 5.
FIG. 7 is a modified form of the wind-up assembly utilized in FIG. 1.

It is well known that in using a worm gearing arrangement the gear will be forced to move along the longitudinal axis of the worm when the worm rotates. However, as shown in FIGURE 3, gear 42 is prevented from moving upwards along worm 40 because it is mounted in fixed position on lead screw 44. In this manner, the gear remains in one position as it rotates to transfer the rotational movement of worm 40 to the lead screw 44 which in turn provides the rotation for stripping material from the collapsible tubes.

The lead screw 44 with gear 42 are nested in an open socket 46 in housing 26. A lead screw support block 48 which provides a bearing support for lead screw 44 is connected to housing 26 by screws 50 (see FIGURE 1). The lead screw support block 48 along with the lead screw 44 and worm gear 42 may be readily removed from the housing 26 for cleaning and maintenance by removing the screws 50.

The stripping means 14 also includes a wind up assembly 52 which comprises a housing 54 (FIG. 2) made up of a top section 56 and a bottom section 57. These two sections are pivotally connected by pivot pin 58 and screw 59.

A shaft 60 is rotatively mounted in opening 61 located in top section 56 of housing 54 and a right handed gear 62 is mounted in fixed position on the shaft to mesh with lead screw 44 so as to form a worm gearing arrangement, the importance of which will be explained in reference to the operation of the stripping means.

The lead screw 44 projects through an opening 64 in the lower section 57 of housing 52 so as to engage gear 62. The lead screw also has a right hand helical thread which extends over that portion of the screw that is exposed to the right beyond support block 48 (FIG. 2).

Referring now to FIG. 1 and to the left hand portion of housing 26 will be seen that the housing is provided with ports 68 and 70 which feed the materials to be mixed into the mixing chamber later described. A first pipe 72 is connected at one end to the port 68 and a second pipe 76 is connected to the second port 70. A support bar 74 which carries the pipes 72 and 76 is bolted in fixed position to the block 48 by bolts 77. Pipes 72 and 76 extend through the support bar 74 and the second end of each pipe terminates in a flange 79. A collar 78 with internal threading is rotatively mounted on the second end of each of the pipes 72 and 76.

As best shown in FIGURE 1 the materials to be mixed are packaged in collapsible tubes 80 and 82 which in the preferred form of structure shown are made of polyethylene plastic material. The tube 80 is for example filled with epoxy base resin and the tube 82 filled with amine catalyst. The tubes 80 and 82 in the preferred embodiment are identical in size and each contain the same volume of material. Each tube is provided with exterior threads on the outlet necks 84. The tubes are readily mounted in the stripping means 14 by tightening the collars 78 on to the threaded neck of the tube. This draws the rim of the outlet neck of the tube tightly up against the flange 79 of the pipes 72 and 76 to form a liquid seal with the flange.

As best shown in FIG. 1 the end portions of shaft 60 that project outside housing 54 are provided with a pair of slots 86 and 88. After the tubes are attached to pipes 72 and 76 the bottom end of each tube is positioned in the respective slots 86 and 88 of shaft 60.

With this construction, when the motor of drill 18 is caused to operate by pressing the trigger 89 rotation of the drive shaft 20 which moves in counterclockwise direction as shown in FIG. 3 is transmitted to the lead screw 44 by the gears 28, 38, 40 and 42 to cause the lead screw to rotate in counterclockwise direction in FIG. 3.

Since, as explained before, the lead screw 44 which has a right handed helical thread, and gear 62 which has a right handed thread are in worm gearing arrangement, the gear 62 carrying the wind up assembly will be forced by the thrust of the worm gearing arrangement towards the right or free end of the lead screw in FIG. 2.

This movement of the wind up assembly to the right is prevented by the counterclockwise rotation of shaft 60 (see FIG. 2) which winds the collapsible tube up on the shaft and thereby pulls the wind up assembly to the left to overcome the thrust towards the free end at the right of the lead screw. This reversed thrust in a direction opposite to the direction in which the wind up assembly moves is an important feature of the present invention which makes it possible to dispense substantially all of the material from the tube. The reverse thrust also materially aids in the accuracy of the amount of material that is stripped from the collapsible tubes since it insures that the tubes will wind on the shaft in a uniform and positive manner without kinks or folds which disturb the accuracy of the material flowing to pipes 72 and 76.

Due to the thrust generated by the two right handed threads there is a tendency for the wind up assembly to rotate in a counterclockwire direction in FIG. 3. This is prevented by a guide rod 90 (FIG. 2) which is mounted in fixed position at one end in the lead screw support block 48 and which has its second end slidably mounted in the bottom section 57 of housing 54. The material which is dispensed from the collapsible tubes 80 and 82 passes through pipes 72 and 76 and through the ports 68 and 70 respectively. The structure described hereinabove constitutes the stripping means for the collapsible tubes.

The mixing means include a mixing chamber 92 mounted in fixed position on housing 26 by means of a bayonet type retainer 94 so as to receive the materials dispensed from the ports 68 and 70 by the stripping means. The free end of main drive shift 24 projects into the right hand portion of mixing chamber 92 as best shown in FIG. 2.

Figure 4:
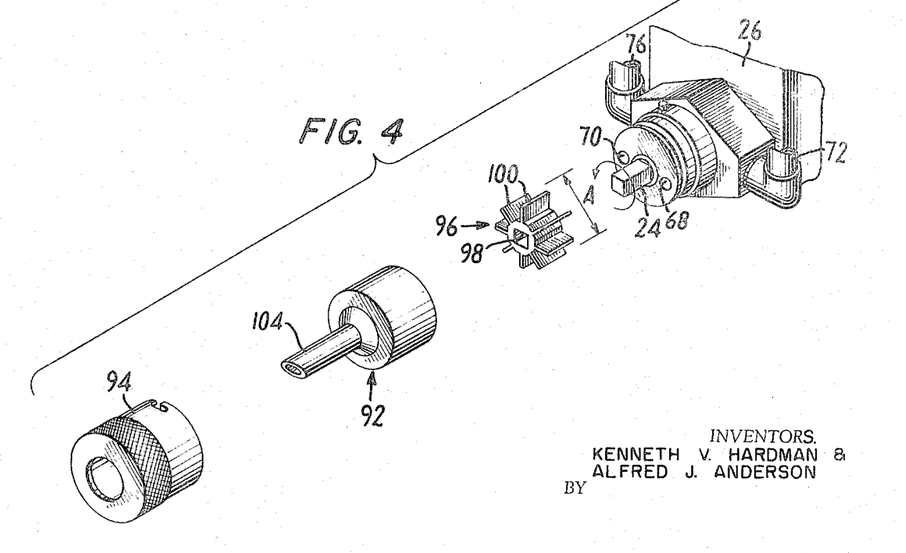
FIG. 4 is an exploded view of the mixing chamber of the caulking gun shown in FIG. 1.

Referring to FIG. 4 it will be seen that an agitator 96 is mounted on the drive shaft 24 by means of the square slot 98 which slides on to the end of the shaft 24 so that the agitator will rotate with the shaft. Agitator 96 has a plurality of projections 100 which extend out from the hub of the agitator. The agitator 96 is held in position on shaft 24 by the mixing chamber 92 and the retainer 94. Screw threads 102 are positioned at the front end in the inside of the wall of mixing chamber 92. The inside diameter of the mixing chamber in the threaded portion thereof is slightly greater than the outside diameter of the agitator measured at the outermost edge of the projections 100.

As the material extrudes into mixing chamber 92 it is forced into the space between the projections 100 of the agitator which is rotating in counterclockwise direction as shown in FIG. 4. Due to the rapid rotation of the agitator small amounts of each of the two materials are commingled and mixed in the spaces between the projections 100 on the hub of the agitator. As additional material is stripped from the collapsible tube it will force the mixed material out the nozzle 104 onto the surface to be treated.

The threaded portion 102 of the mixing chamber is preferably a left handed thread. This materially assists in mixing the material since the left handed thread tends to feed the material back upon itself in a direction towards housing 26. This increases turbulence and the mixing efficiency of the gun.

The mixing means consisting of chamber 92 and the agitator 96 are made of molded polyethylene plastic which is an inexpensive material and therefore the two elements may be readily replaced at low cost. This is of particular advantage in those cases where the catalized epoxy resin has a short pot life and sets up in the mixing chamber during the interruption in operation of the gun.

When the collapsible tubes 80 and 82 are empty or if a different material is to be used the tubes are readily removed by unscrewing the collars 78 from the threaded neck portion of the tubes. This will release the front end of the tubes from the gun. All that is then required is to release screw 59 which holds the top and bottom sections of housing 54 together. The top section 56 of the housing is then pivoted up away from the bottom section 57 which will disengage the worm gear 62 from the lead screw 44. Once gear 62 is released from lead screw 44 it can rotate freely and the wind up assembly can be readily moved along the lead screw 44 and guide rod 90. The operator is then only required to pull the tubes free from the shaft 60.

The reactant materials contained in the pipes 72 and 76 and ports 68 and 70 will not set since these materials are never in contact with each other until they reach the mixing chamber. Therefore, there is no need to clear these elements unless a different material is to be used. If new material is to be used the pipes 72 and 76 and ports 68 and 70 and the mixing chamber are all cleaned with suitable solvents before the new materials are used. Alternatively these elements may be cleaned by dispensing the new materials to flush out the old.

Although the preferred material for the collapsible tubes is polyethylene plastic, it will be understood that any plastic or metal tubes can be used as long as they are collapsible and are capable of being wound up.

Also, although the tubes shown in the preferred embodiment have the same cross sectional areas, so as to dispense in a one to one ratio, they can have different cross sectional areas to obtain different mixing ratios. For example, if the material is to be mixed in a ratio of one to two, the cross sectional area of one of the tubes will be twice as large as the other tube. Since the tubes will roll up in equal lengths, the volume of the material forced from the large tube will be twice the amount forced from the smaller area tube resulting in the desired mixture.

An alternate arrangement for connecting the top and bottom sections of the wind up assembly housing 54 is shown in FIGS. 5 and 6. As there shown a cam 106 is used in place of screw 59. The cam which is a U-shaped bar (FIG. 6) is mounted on a post 108 which in turn is mounted in the bottom section 57 of housing 54.

The cam is pivotally mounted on the post 108 by means of a pin 110 which passes through the cam at the open end of the U-shaped bar and at an off-center position. The location of the pin in the cam is chosen so that the cam when raised will clear the top section 56 of the housing to unlock the top section 56 from the bottom section 57 and when the cam is lowered the bottom of the cam will contact the top section of the housing locking the top section 56 onto the bottom section 57.

As best shown in FIG. 7, shaft 60 of the wind-up assembly may be provided with a take-up wheel 112 which allows manual operation of the wind-up assembly. The wheel, which is knurled to aid in gripping it, is mounted in fixed position on shaft 60 and will move the shaft 60 when the wheel is turned.

When using the take-up wheel, gear 62 must first be disengaged from lead screw 44. The operator may then turn the wheel in the direction of wind-up which will rotate the shaft and force the material from the tubes. This has the advantage of causing the flowable material to rapidly fill the passages from the stripping means to the mixing means, when first using the caulking gun, without resorting to the power means.

Figure 8:
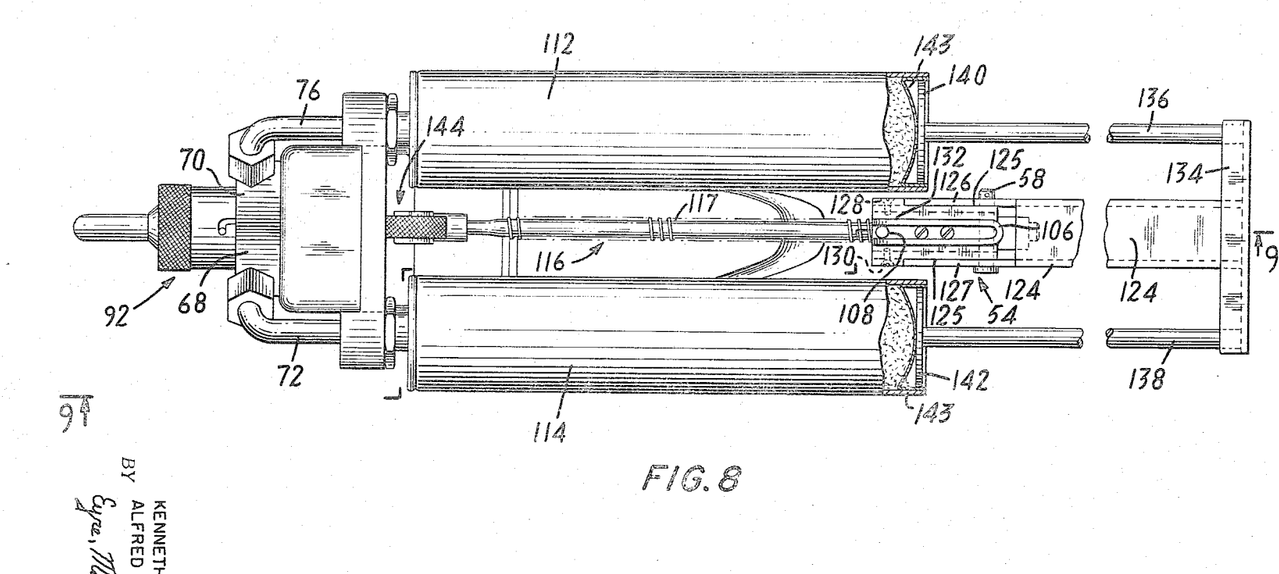
FIG. 8 is a top elevation of a second embodiment of caulking gun with non-collapsible tubes and pistons and incorporating a clutch means and a shut-off valve assembly.

FIG. 8 shows a second embodiment of caulking gun which has been modified to dispense material from non-collapsible tubes 112 and 114. A lead screw 116, which is made up of two sections 117 and 119 (see FIG. 10), is provided with a left-hand thread the importance of which will be discussed in connection with the operation of the device. Seated on section 117 of lead screw 116 is the housing 54 which is the same as that shown in FIG. 5 and FIG. 6 except that in place of gear 62 a half nut 118 having a left-hand thread is provided. The half nut 118 is mounted in fixed position to the top section 56 of housing 54 by two bolts 120 and 122. The half nut is arranged so as to mesh with section 117 of lead screw 116 which passes through an opening 64 in the bottom section 57 of housing 54 to form a worm gearing arrangement.

Referring to FIG. 8, mounted on housing 54 is a C channel 124 having at one end thereof a section 125 of its web removed so as to form two legs 126 and 127 which straddle the housing. The legs 126 and 127 are attached to the housing by means of pivot pin 58 which passes through leg 126, the top section 56 and bottom section 57 of housing 54 and leg 127. To obtain perfect alignment of the rods during operation of the device two additional screws 128 and 130 are attached to legs 126 and 127 respectively and inserted into a drilled tap located in section 57 of housing 54. By tightening the screws the legs are held in alignment and securely fastened to housing 54. The other end of channel 124 is fastened to a bar 134. Also attached to bar 134 are two piston rods 136 and 138 having pistons 140 and 142 respectively mounted at their free ends. The pistons 140 and 142 are inserted into the non-collapsible tubes 112 and 114 respectively and bear against plates 143 located in the collapsible tubes (see FIG. 8). Plate 143 prevents the material from leaking out the back of the tubes and prevents the material from coming in direct contact with the pistons which would otherwise require cleaning every time the tubes were changed.

The gun of FIG. 8 operates in the same manner as the caulking gun of FIG. 1. Referring to FIG. 2 and FIG. 3, the motor of drill 18 is caused to operate by pressing the trigger 89 which will cause the drive shaft 20 to rotate in a counterclockwise direction. The rotation of drive shaft 20 is transmitted to lead screw 116 by means of gears 28, 38, 40 and 42 so as to cause the lead screw 116 to rotate in a counterclockwise direction. Since lead screw 116 has a left hand thread and since the half nut which is attached to the housing 54 and meshes with lead screw 116 has a left hand thread, the housing will move towards the left or the ports 68 and 70 which feed the material to be mixed into the mixing chamber (see FIG. 8). When the housing 54 moves to the left, channel 124 and in turn the piston rods and pistons will also move to the left and thereby force the material contained in the non-collapsible tubes 112 and 114 out through pipes 76 and 72 into the mixing chamber 92 as has been previously explained. When the non-collapsible tubes are empty or if a different material is to be used, the tubes are readily removed in the same manner as explained in connection with the collapsible tubes. The half nut 118 is disengaged from the lead screw by rotating the cam 106 off the top section 56 of housing 54 which holds the top section 56 to the bottom section 57 of housing 54. The top section 56 of the housing is then pivoted away from the bottom section 57 which will disengage the half nut 118 from lead screw 116. Once the half nut 118 is released from lead screw 116, the housing can be readily moved along the lead screw and guide rod 90 and the pistons removed from the non-collapsible tubes. The manner of connecting and disconnecting the non-collapsible tubes to pipes 76 and 72 is the same as was described for the collapsible tubes and need not be repeated.

Figure 10:
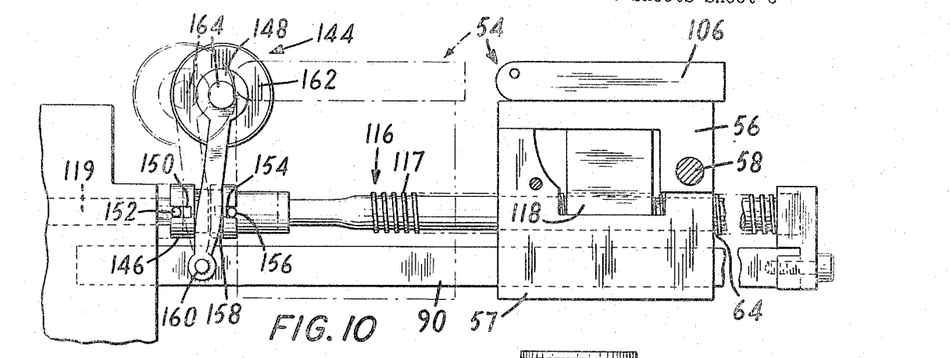
FIG. 10 shows a side view partly in section of the clutch means utilized in FIG. 8.

Referring to FIG. 10, a clutch means 144 is shown which will disengage section 117 of lead screw 116 from section 119 after the tubes are emptied of the material to be mixed. It is important to provide the clutch means for the device in order to prevent the pistons 140 and 142 from bearing against the ends of the tubes 112 and 114 respectively when the motor is on and after all the material has been stripped from the tubes. Without the clutch means, the motor would be damaged or the threads on the half nut or lead screw would be stripped.

The clutch means comprises a sleeve 146 and two lever arms 148. The sleeve 146 has at one of its ends two slots 150 which engage two pins 152 located on section 119 of lead screw 116. At the other end of sleeve 146, four slots 154 are provided which engage four pins 156 located on section 117 of lead screw 116. Although the number of slots and pins provided can be varied, it has been found that by using four slots and pins the sleeve can be readily engaged to section 117 without undue shearing force being applied against the pins.

The length of slots 150 are made at least twice the diameter of pins 152 in order that they will remain engaged to pins 152 when the sleeve is moved to engage pins 156 located on section 117 of lead screw 116. This will be more fully explained in connection with the operation of the clutch.

The center portion 158 of sleeve 146 is provided with a smaller diameter than the end portions of the sleeve in order to receive the lever arms 158. One lever arm is located on each side of the central portion of the sleeve and in contact therewith. The lever arms 158 are attached by means of a pivot pin 160 which passes through the first lever arm, guide rod 90 and the second lever arm. At the free end of the lever arms 158 a wheel 162 having a knurl rim is provided and attached between the two lever arms by means of a bolt 164.

In operation of the device, the clutch is initially set by pivoting the lever arm 158 towards the right (see FIG. 10), which will move the sleeve towards the right and engage slots 154 with pins 156. Since the length of slots 150 are at least twice the diameter of pins 152, the sleeve 146 will remain engaged to section 119 when the lever arm is pivoted to engage pins 156 (see FIG. 10). When the motor is turned on, the rotative motion will be transferred to section 119 of lead screw 116 by means of the gear train. In turn, the rotative motion of section 119 will be transferred to section 117 of lead screw 116 by means of sleeve 146. The housing 54 mounted on section 117 will then move to the left (see FIG. 10) until all the material is dispensed from the tubes. When the pistons reach the end of the tubes, the housing will bear up against wheel 162 and pivot the lever arms 148 towards the left. This action will disengage sleeve 146 from section 117 of lead screw 116 as shown in ghost in FIG. 10. Therefore, although the motor is still running and thereby rotating section 119 of lead screw 116, since section 117 is not connected to section 119, section 117 will be static. This prevents damage to the motor and stripping of the threads of section 117 or half nut 118 even though the motor is on.

Figure 9:
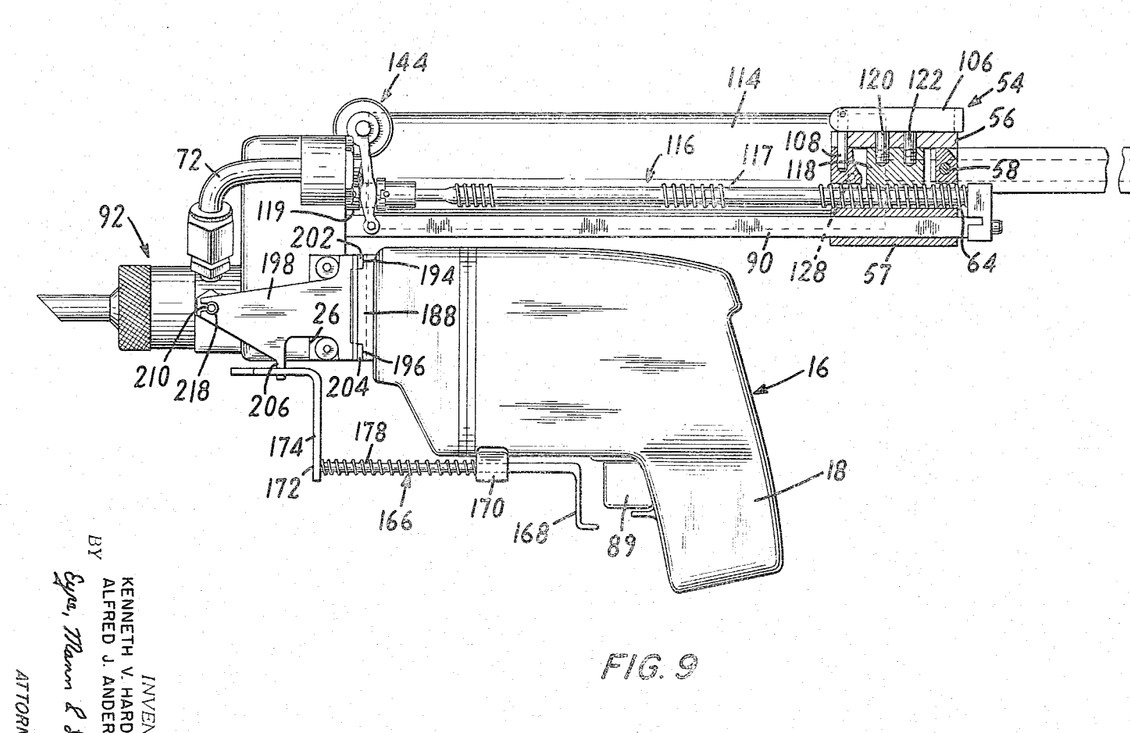
FIG. 9 is a partial sectional view taken along line 9—9 of FIG. 8.

Another feature of the invention is a shut-off valve assembly 166 which will prevent the material from dripping out of the device when the motor is off. Referring to FIG. 9, a trigger 168 is provided which is mounted in front of trigger 89 of drill 18 the importance of which will be explained in connection with the operation of the assembly. The trigger 168 is slidably mounted to the drill by means of a trigger support 170. Attached to one end of the trigger 168 at 172 is a right angle bar 174 which is connected to a plate 176 at 177 shown in FIG. 11. Also mounted on the trigger 168 is a spring 178 which bears against support 170 and angle bar 172 to return the trigger to its neutral position after the trigger is released.

Figure 11:
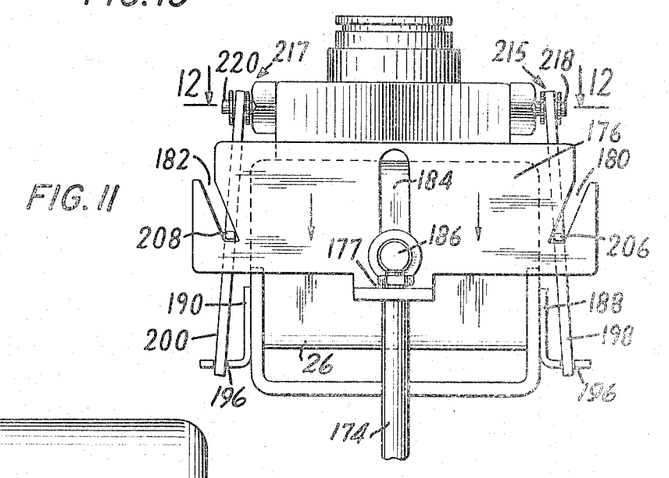
FIG. 11 showing the shut-off valve assembly for the caulking gun.

The plate 176 is provided with angular slots 180 and 182 and a longitudinal slot 184 located at the center of the plate. The plate is slidably mounted to the base of the drill by means of a shoulder bushing 186 which passes through slot 184 as shown in FIG. 11. In this manner the plate can slide in a vertical direction relative to the shoulder bushing. Also provided are two angle brackets 188 and 190 which are mounted on opposite sides of housing 26. Each of the angle brackets have two slots 194 and 196 located at their top and bottom portions respectively (see FIG. 9). Pivotally mounted in the slots of each bracket 188 and 190 are two plates 198 and 200 respectively. The plates are mounted to the bracket by means of two protrusions 202 and 204 which are located at the top and bottom portions of the plates and which slide into the slots 194 and 196 as shown in FIG. 9. At the bottom of the central portion of each of the plates 198 and 200, a third protrusion 206 is provided which is seated in the angular slots 180 and 182 of plate 176 the importance of which will be explained below.

Figure 12:
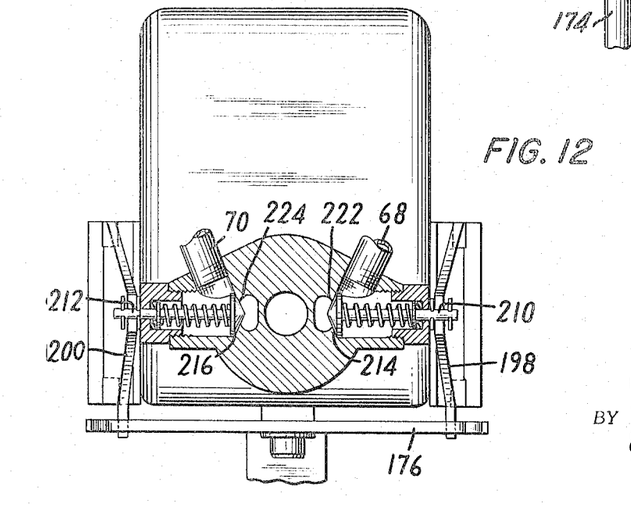
FIG. 12 is a sectional view taken along line 12—12 of FIG. 11.

Referring to FIGS. 11 and 12, two piston rods 210 and 212 having mounted thereon two pistons 214 and 216 respectively are connected to plates 198 and 200 at 215 and 217 by means of shoulder bushings 218 and 220. The pistons 214 and 216 will rest up against piston seats 222 and 224 respectively when the valve assembly is off.

In operating the device, trigger 168 is pulled causing the right angle bar 174 to move towards the right as shown in FIG. 9. In turn plate 176 which is attached to the right angle bracket will also move towards the right resulting in the protrusions 206 and 208 to move up along the angular slots 180 and 182 respectively. Since the plates 198 and 200 are pivotally mounted in slots 194 and 196, the plates will rotate away from housing 26. As the plates rotate they will move the piston rods 210 and 212 and in turn the pistons 214 and 216 away from piston seats 222 and 224 respectively. The material can now flow through the ports 68 and 70 and thereby enter the mixing chamber.

In this arrangement the pistons move away from the piston seats by means of the above described linkage prior to trigger 168 meeting trigger 89 of the drill. As trigger 168 is further pulled, it will bear against trigger 89 causing the motor to turn on and thereby force the material out through the tubes.

In turning the gun off, the trigger 168 is released and in turn trigger 89 will also be released to shut off the motor. When the motor is turned off, pistons 214 and 216 have not yet reached the piston seats 222 and 224. As trigger 168 is further released plate 176 will move in an upwards direction, as viewed in FIG. 11, and the protrusions 206 and 208 located on plates 198 and 200 respectively will slip down into the angular slots 180 and 182. This in turn will cause the plates 198 and 200 to rotate towards housing 26 forcing piston rods 210 and 212 and thereby pistons 214 and 216 respectively to move up against piston seats 222 and 224 closing the ports 68 and 70. This will prevent any additional material from flowing out into the mixing chamber and thereby prevent any drip of the material from the gun after the motor has been turned off.

As explained before the valve assembly of the invention, the pistons move away from the piston seats just before the motor is turned on and the pistons do not return to the piston seats until after the motor is turned off. This is very important in order to prevent pumping against a closed system which could rupture the tubes or damage the motor.

Other modifications of the preferred embodiments of the invention will be readily apparent to those skilled in the art as, for example, three or more tubes containing different materials may be used in place of the two shown in the preferred embodiments. It will also be understood that any form of lands, grooves or protuberances may be substituted for the threads 102 in mixing chamber 92 provided, of course, that the lands and grooves or protuberances are adapted as in a helix arrangement to feed the material back upon itself toward housing 26.

It will be understood that it is intended to cover all changes and modifications of the preferred embodiment of the invention, herein chosen for purpose of illustration, which do not constitute departures from the spirit and scope of the invention as claimed.

What is claimed is:

1. A device for mixing and dispensing contents from a plurality of tubes which comprises stripping means for stripping material from said tubes, mixing means for receiving, mixing and dispensing said materials from said stripping means, said mixing means comprising a chamber with an outlet port, an agitator rotatively mounted in said chamber, said chamber having a thread cut along at least a portion of its inside wall coacting with said agitator to feed the material being mixed back upon itself away from the outlet port.

2. A device for mixing and dispensing material which comprises:
    (a) a prime mover;
    (b) a plurality of tubes;
    (c) a screw drive, said screw drive having a first and a second section;
    (d) clutch means for connecting and disconnecting said first and said second sections of said screw drive;
    (e) means for stripping the material from said tubes;
    (f) gear means for connecting said prime mover to said first section of said screw drive;
    (g) a mixing chamber;
    (h) means for feeding the material to said mixing chamber;
    (i) said mixing means having an agitator for mixing the material therein; and
    (j) means for connecting the agitator in the mixing chamber with the prime mover.

3. The structure of claim 2 wherein said clutch means disconnects the first section from said second section of said screw drive when almost all the material has been dispensed from said tubes.

4. A device for mixing and dispensing material which comprises:
    (a) a prime mover;
    (b) a plurality of tubes;
    (c) means for stripping the material from said tubes;
    (d) gear means connecting said stripping means to said prime mover;
    (e) a mixing chamber;
    (f) means for feeding the material to said mixing chamber, said feeding means having at least two ports;
    (g) a shut-off valve assembly acting on said ports, said shut-off valve assembly opening said ports just before the prime mover is turned on and closing said ports just after the prime mover is turned off;
    (h) said mixing means having an agitator for mixing the material therein; and
    (i) means for connecting the agitator in the mixing chamber with the prime mover.

5. A structure as specified in claim 4 wherein the shut-off valve assembly comprises pistons and linkage means connected to said pistons, said linkage means acting on said pistons to move the pistons up against the ports just after the prime mover is turned off and away from the ports just before the prime mover is turned on.

6. A device for mixing and dispensing material which comprises:
    (a) a plurality of non-collapsible tubes;
    (b) a main drive shaft;
    (c) means for driving the main drive shaft;
    (d) piston means for dispensing material from said non-collapsible tubes;
    (e) driving means for pushing said piston means into the non-collapsible tubes for stripping out the material therefrom;
    (f) gear means for connecting said driving means to said drive shaft, said gear means including a screw having a helical thread and a half nut which meshes with said screw to push said drive means in the same direction as the material is being dispensed;
    (g) a mixing chamber;
    (h) means for feeding the material to said mixing chamber;
    (i) said mixing chamber having an agitator for mixing the material therein and having projections along a portion of its inside wall arranged to coact with said agitator to force a portion of the material back upon itself in a direction opposite to the direction of flow of the material being dispensed from said mixing chamber; and
    (j) means for connecting the agitator in the mixing chamber with the main drive shaft.

7. A structure as specified in claim 6 wherein said half nut is mounted in a housing, said housing consisting of a bottom section, a top section pivotally mounted on said bottom section, a cam pivotally mounted on said top section, said half nut being fixedly mounted on said top section whereby the half nut will be disengaged from said screw when said cam is pulled away from the top section to release the top section from the bottom section of the housing.

8. In a mixing and dispensing device of the type having a plurality of collapsible tubes and stripping means for stripping material from said tubes to force said material into a chamber for mixing and dispensing through an outlet port of said mixing chamber, the improvement which comprises, a rotary agitator coacting with protuberances positioned in the mixing chamber adapted to feed the material being mixed back upon itself away from the outlet port when said outlet port is open.

9. A device for mixing and dispensing material which comprises:
    (a) a plurality of collapsible tubes;
    (b) a main drive shaft;
    (c) means for driving the main drive shaft;
    (d) rotative means for winding up the closed end of said collapsible tubes for stripping out the material therefrom;
    (e) gear means for connecting said rotative means to said drive shaft;
    (f) a mixing chamber;
    (g) means for feeding the material to said mixing chamber;
    (h) said mixing chamber having an agitator for mixing the material therein, said mixing chamber having projections along a portion of its inside wall arranged to coact with said agitator to force a portion of the material back upon itself in a direction opposite to the direction of flow of the material being dispensed from said mixing chamber;
    (i) means for connecting the agitator in the mixing chamber with the main drive shaft.

10. A device for mixing and dispensing material which comprises:
    (a) a plurality of collapsible tubes;
    (b) a main drive shaft;
    (c) means for driving the main drive shaft;
    (d) rotative means for winding up the closed end of said collapsible tube for stripping out the material therefrom;
    (e) gear means for connecting said rotative means to said drive shaft, said gear means includes a screw having a helical thread and a gear which meshes with said screw to drive said rotative means and provide a thrust in a direction opposite to the direction of wind up of said tubes;
    (f) a mixing chamber;

(g) means for feeding the material to said mixing chamber;
(h) said mixing chamber having an agitator for mixing the material therein; and
(i) means for connecting the agitator in the mixing chamber with the main drive shaft.

11. A structure as specified in claim 10 in which the rotative means includes a wind up shaft with means for connecting the shaft to the closed end of said collapsible tubes.

12. A structure as specified in claim 11 which includes a wheel mounted on said wind up shaft for manually rotating said shaft to wind up said tubes.

13. A structure as specified in claim 11 wherein said rotative means is mounted in a housing, said housing consisting of a bottom section, a top section pivotally mounted on said bottom section, a cam pivotally mounted on said top section, said wind up shaft and gear being rotatively mounted in said top section whereby the gear will be disengaged from said screw when said cam is pivoted away from the top section to release the top section from said bottom section of the housing.

14. A device for mixing and dispensing contents from collapsible tubes which comprises, stripping means for stripping material from said tubes, said stripping means comprising a lead screw having a helical thread, a shaft for receiving the closed end of said collapsible tubes, a gear mounted on said shaft which meshes with said lead screw, said lead screw and said gear providing a thrust in a direction opposite to the direction of wind up of said tubes, mixing means for receiving, mixing and dispensing said materials from said stripping means and a prime mover connected to said stripping means and said mixing means to simultaneously drive said mixing means and said stripping means.

References Cited by the Examiner

UNITED STATES PATENTS

| | | | |
|---|---|---|---|
| 1,156,106 | 10/1915 | Smart | 222—102 X |
| 2,001,983 | 5/1935 | Spiros | 222—102 X |
| 2,030,560 | 2/1936 | Adams | 103—93 |
| 2,140,007 | 12/1938 | Grandman | 222—102 X |
| 2,788,953 | 4/1957 | Schneider | 222—134 |
| 3,029,983 | 4/1962 | Wagenhals | 222—94 |
| 3,187,951 | 6/1965 | Hardman et al. | 222—102 |

ROBERT B. REEVES, *Primary Examiner.*

M. HENSON WOOD, Jr., *Examiner.*

H. S. LANE, *Assistant Examiner.*